(12) United States Patent
Owen

(10) Patent No.: US 9,769,612 B1
(45) Date of Patent: Sep. 19, 2017

(54) STREAMING AT TARGET LOCATIONS

(71) Applicant: WOWZA MEDIA SYSTEMS, LLC, Golden, CO (US)

(72) Inventor: Barry Owen, Littleton, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/240,246

(22) Filed: Aug. 18, 2016

(51) Int. Cl.
| | | |
|---|---|---|
| H04W 24/00 | (2009.01) | |
| H04W 4/02 | (2009.01) | |
| H04L 29/06 | (2006.01) | |
| G01S 19/13 | (2010.01) | |
| H04L 29/08 | (2006.01) | |
| H04W 88/02 | (2009.01) | |

(52) U.S. Cl.
CPC ............ *H04W 4/023* (2013.01); *G01S 19/13* (2013.01); *H04L 65/4069* (2013.01); *H04L 67/26* (2013.01); *H04W 88/02* (2013.01)

(58) Field of Classification Search
USPC ............... 455/426.1, 404.2, 414.2; 340/521; 701/201; 700/91
See application file for complete search history.

(56) References Cited

U.S. PATENT DOCUMENTS

| | | | |
|---|---|---|---|
| 8,621,019 B2 | 12/2013 | Nguyen et al. | |
| 8,769,031 B1 | 7/2014 | Lee et al. | |
| 2004/0068364 A1* | 4/2004 | Zhao | G01C 21/3492 701/468 |
| 2007/0139182 A1* | 6/2007 | O'Connor | G08B 27/006 340/521 |
| 2013/0005294 A1* | 1/2013 | Levinson | H04N 7/18 455/404.2 |
| 2013/0247120 A1 | 9/2013 | Milgramm | |
| 2014/0172135 A1* | 6/2014 | Eisner | G06F 15/17306 700/91 |
| 2016/0127441 A1* | 5/2016 | Monastyrskyy | H04L 65/602 709/219 |

OTHER PUBLICATIONS

Rainie, "Americans' Views on Mobile Etiquette, Chapter 1: Always on Connectivity," Pew Research Center, http://www.pewinternet.org/2015/08/26/chapter-1-always-on-connectivity/, Aug. 26, 2015, 3 pages.

* cited by examiner

*Primary Examiner* — David Q Nguyen
(74) *Attorney, Agent, or Firm* — Toler Law Group, PC

(57) ABSTRACT

A method includes determining, at a server based on location information associated with a mobile device, that the mobile device is within a particular range of a target location. The method also includes sending a notification to the mobile device requesting a video stream from the mobile device, where the video stream is to be captured at the target location.

18 Claims, 7 Drawing Sheets

STREAMING AT TARGET LOCATIONS

BACKGROUND

The popularity of the Internet, coupled with the increasing capabilities of personal/mobile electronic devices, has provided consumers with the ability to enjoy multimedia content almost anytime and anywhere. For example, live content streams (e.g. video and/or audio media streams), can be streamed via the Internet from mobile electronic devices (e.g., mobile phones, tablets, computers, and drones) to other electronic devices (e.g., computers, mobile phones, tablets and Internet-enabled televisions).

Some mobile electronic devices may be capable of transmitting a video stream in addition to receiving a video stream. For example, a mobile electronic device may include one or more cameras that can be used to capture and save video files, participate in live video conferencing, and transmit a live video stream to a server or to another electronic device. Mobile electronic devices may provide other functionality in addition to sending or receiving live video streams. For example, in certain instances, a notification may be used to notify a mobile device user when a certain event occurs (e.g., a weather alert or a flight delay). In other examples, mobile applications ("apps") executing on a mobile device can also alert a user that the mobile device is in a particular location or in proximity to another mobile device.

SUMMARY

The Pew Research Center has estimated that 92% of American adults own a cellular phone, including 67% that own a smartphone. Moreover, an estimated 90% of cellular phone owners have stated that they "frequently" carry their cellular phone with them. It will be therefore be appreciated when a live event of interest occurs, there may be dozens of people, if not more, that are in the area and that own a mobile electronic device capable of capturing a live video stream of the event. The present application discloses systems and methods to send notifications to the electronic devices carried or worn by such people to request that they travel to a target location (if needed) and capture a live video stream at the target location.

With the increasing prevalence of live video streaming, demand for multiple perspective viewpoints of live events is anticipated to increase. For example, viewers may be interested in, and in some cases may expect, instantaneous and precise perspective live streams of live events, news, weather, sports, natural disasters, accidents (e.g., building fires), public festivals, concerts, protests, public gatherings, etc. Events of interest may range from a school concert or football game to network coverage of a high-speed chase or a tornado. For example, it may be desired to have live perspective streams of a high school football game at the 50 yard-line, at the end-zones, or even the sidelines. The present disclosure may enable satisfying such demands.

In particular aspects, when a user indicates a willingness to capture and transmit a live video stream from the target location, the notification or subsequent message(s) may automatically configure a video capture/encoding/streaming mobile app at the user's mobile device. Alternatively, or in addition, the notification or subsequent message(s) may provide the user with directions to the target location. Moreover, further notifications or subsequent message(s) may provide the user with: additional information regarding how the user should capture the live stream from the target location: an instruction to proceed to another nearby location to capture a second video stream at a second target location that is near or in a predetermined proximity to the target location, etc.

DETAILED DESCRIPTION

Push notifications and/or mobile apps may be enabled to configure various mobile encoders. By doing so, a content aggregator may efficiently gather real-time footage from a variety of different sources (e.g., mobile devices) to obtain better and more complete coverage of a live event at a target location. Live events may be related to any live experience including news, sports, concerts, crime investigations, traffic, weather, etc.

In some circumstances, video and audio streams may be obtained on-the-fly (e.g., without knowing the time or the precise location of the live event before the live event begins). By establishing a network of mobile recording devices, faster and more precise coverage of live events may be achieved.

Moreover, the push notifications and/or mobile apps described herein may automatically configure a mobile encoder to stream to a specific content aggregator end point (e.g., a media server), which may enable the content aggregator to control and manage a large number of incoming video feeds from various types of encoders and from various events/locations. Push notifications may be automatically "triggered" by factors, including but not limited to the proximity of a mobile device to a specific target location. Push notifications may also configure operation at the mobile device and/or conduct pre-launch services, as further described herein.

Figure 1:
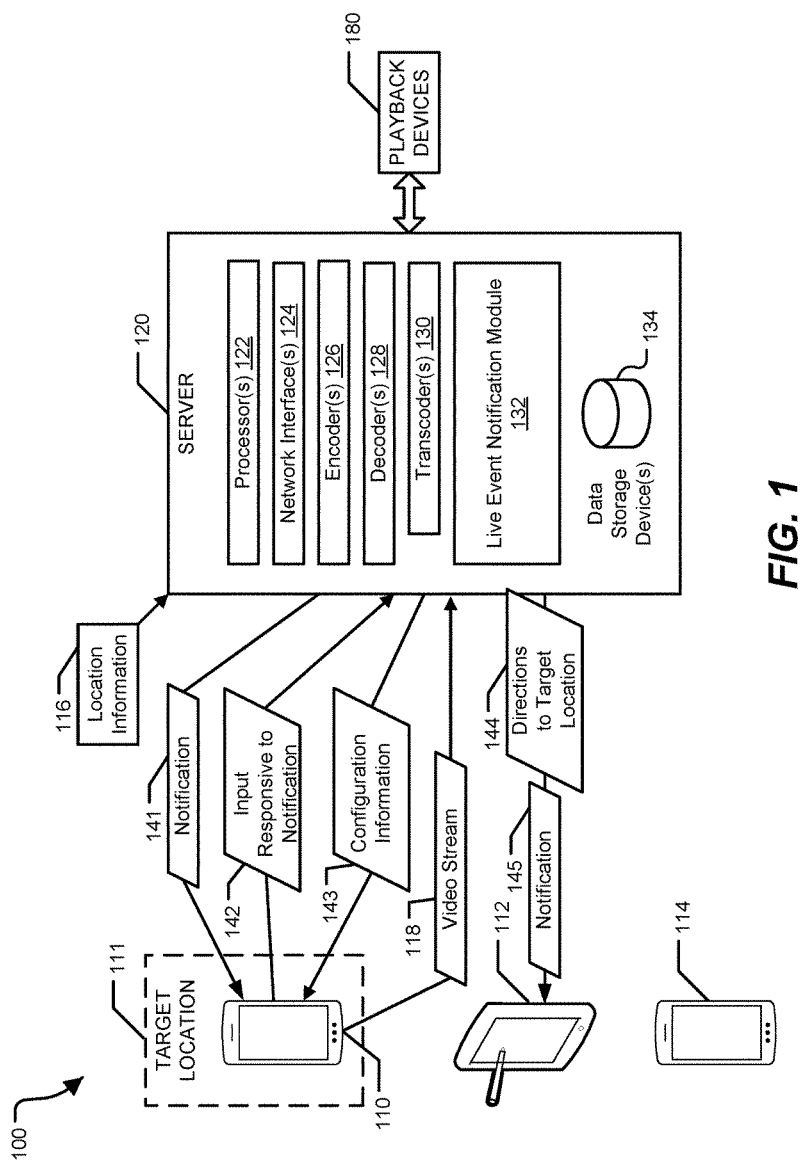
FIG. 1 is a diagram of a particular embodiment of a system to support streaming at target locations.

Referring to FIG. 1, a diagram of a particular embodiment of a system 100 to support streaming at target locations is disclosed. FIG. 1 shows a first recording device (e.g., a mobile device that includes a camera) 110, a second recording device 112, and third recording device 114. FIG. 1 also shows a server (e.g., a media server and/or streaming server) 120, and playback devices (e.g., streaming devices, client devices, and/or computing devices) 130. The recording devices 110-114, the server 120, and the playback devices 180 may be communicably coupled via one or more networks. While illustrated in FIG. 1 as individual components, it is to be understood that one or more of the recording devices 110-114, the server 120, and the playback devices 180 may be distributed across a plurality of devices. For example, the server 120 may correspond to a plurality of redundant servers. In examples with redundant servers, one or more of the recording devices 110-114 may select or be routed to one or more of the redundant servers based on a geolocation of the particular recording device, based on data provided by the recording device, or based on some other factor(s).

Although FIG. 1 illustrates three recording devices 110-114, it is to be understood that more or fewer recording devices may be present in alternative examples. Examples of the recording devices 110, 112, 114 include, but are not limited to, mobile phones, cameras, tablet computers, laptop computers, portable media players, wearable electronic devices, drones, etc. Thus, in various examples, each of the recording devices 110-114 may include a processor, a memory, network interface(s), input/output devices (e.g., a touchscreen), a camera or other image sensor, etc.

The server 120 may include one or more processors 122 and various components that are executable by the one or more processors 122. The server 120 may correspond to or include software application(s) that perform media serving or processing, hardware systems (e.g., servers) that support or perform media serving and processing, or any combination thereof. Thus, various operations described with reference to the server 120, or components thereof, may be implemented using hardware, software (e.g., instructions executable by the one or more processors 122), or any combination thereof. In a particular embodiment, one or more operations and/or components described with reference to the server 120 may correspond to operations and/or components of a cloud-based media server (e.g., a media server available as software as a service (SaaS)). In alternative embodiments, operations described with reference to the server 120 may be performed by another type of computing device, such as a mobile device, a desktop computer, a laptop computer, etc.

The server 120 may include one or more network interfaces 124. For example, the one or more network interfaces 124 may include input interface(s) and output interface(s) that are configured to receive data and to send data, respectively. In a particular embodiment, the one or more network interfaces 124 may be wired and/or wireless interfaces that enable the server 120 to transfer and receive data via a network, such as the Internet. For example, the one or more network interfaces 124 may include an Ethernet interface, a wireless interface compatible with an IEEE 802.11 protocol, or other wired or wireless interfaces.

In examples, the network interface(s) 124 may be configured to receive location information 116 associated with one or more of the recording devices 110-114 and video stream(s) from one or more of the recording devices 110-114, as further described herein. Examples of the location information 116 associated with a recording device or a mobile device may include, but are not limited to global positioning system (GPS) information associated with the device, base station information associated with the device, wireless access point information associated with the device, or a combination thereof. The network interface(s) 124 may also be configured to send notification(s) to one or more of the recording devices 110-114, as further described herein.

The server 120 may also include encoder(s) 126 and decoder(s) 128, each of which may be implemented using hardware and/or software (e.g., instructions executable by the one or more processors 122). The decoder(s) 128 may decode a stream received from one of the recording devices 110-114 to generate a decoded stream. The encoder(s) 126 may re-encode the decoded stream to generate one or more second encoded streams. In a particular embodiment, the one or more second encoded streams are adaptive bitrate (ABR) renditions that may have larger or smaller bitrates, frame sizes, etc. as compared to the originally received stream. The server 120 may offer the ABR renditions for streaming to destination devices, such as one or more of playback devices 180, as further described herein.

Transcoder(s) 130 may enable the server 120 to provide adaptive bitrate streaming in real-time (e.g., on-the-fly) or in near-real-time. Although transcoder(s) 130 are shown, it is to be understood that in alternative examples the server 120 may perform or transmuxing operations instead of or in addition to transcoding operations. In some examples, one or more of such operations may be performed to modify a video encoding format, an audio encoding format, a bitrate, an aspect ratio, packaging, etc. relative to a received video stream. In a transmuxing operation, encoded audio and video may be repackaged without modifying the encoded audio and video.

Data storage device(s) 134 at the server 120 may be used to store streamed events and store data associated with requesting, receiving, and managing the streamed events. The data storage device(s) 134 may also buffer chunks of an ABR rendition and store software programs and/or data used by the server 120 (e.g., a file, such as an extensible markup language (XML) file that includes encoder settings to be used by a recording device). The data storage device(s) 134 may correspond to one or more random access memory (RAM) devices, read-only memory (ROM) devices, hard-drive(s), solid state drive(s), etc.

The server 120 may also include a live event notification module 132. The live event notification module 132 may enable the server 120 to send various notifications to the recording devices 110-114 and to receive input from the recording devices 110-114. Notifications may include, but are not limited to, requests for a willingness to initiate video streaming, acknowledgements of affirmative responses by users of the recording devices 110-114, directions to a target location, instructions for how to capture a video recording, requests for video recording at a different target location, etc. In particular examples, the notifications include a push notification or a mobile application notification (e.g., an on-screen notification that is displayed during execution of, or that can initiate execution of, a specific mobile application).

The playback devices 180 may include devices that are configured to receive media stream(s) from the server 120. For example, the playback devices 180 may include one or more computer systems, such as desktops, laptops, etc. The playback devices 180 may also include one or more televisions (TVs), TV set-top-boxes, smartphones, and tablet computers. In a particular embodiment, the server 120 is configured to send media streams to other server(s), such as edge servers of a content delivery network (CDN).

During operation, the server 120 may receive the location information 116 regarding the whereabouts of the recording devices 110-114. In a particular example, the users of the recording devices 110-114 may have previously opted-in to provide the location information 116 to the server 120. To illustrate, when a user installs a mobile encoding application, the user may have the ability to opt-in to being notified by a content aggregator regarding when the user is near an event that is of interest to the content aggregator. In some examples, the content aggregator may incentivize the user to opt-in by providing monetary compensation for opting-in (e.g., a one-time or per-stream payment, discounted products/services, etc.). In some examples, the server 120 receives the location information 116 periodically from each recording device 110-114.

The server 120 may determine (or may receive input indicating) that a live event of interest is occurring at a target location 111. Such input may be received via user input at a server, based on tracking news feeds and/or social networking feeds, etc. In response, the server 120 may use the location information 116 to identify recording devices that are at the target location 111 or that are within a particular range of the target location 111.

To illustrate, in the example of FIG. 1, the first recording device 110 is located within the target location 111. The second recording device 112 is located outside of the target location 111, but is within a particular range of the target location 111. The third recording device 114 is located outside the particular range of the target location 111. In some examples, the particular range is a numerical distance, such as a few feet or meters, several hundred feet or meters, a mile or a kilometer, etc. Alternatively, the particular range corresponds to a geographic boundary of a particular place. To illustrate, if the target location 111 is the fifty yard line of a football stadium, the particular range may correspond to the boundaries of the stadium. In this example, recording devices 110-112 within the particular range of the stadium are those that are carried or worn by fans that are in the stadium (and that, therefore, are able to record video of the fifty yard line), rather than devices being carried or worn by fans that are tailgating outside the stadium.

In response to determining that the first recording device 110 is in the target location 111, the server 120 may send a notification 141 to the first recording device 110. The notification 141 may include a request for the first recording device 110 to initiate capturing a video stream from the target location 111 and to send the video stream to the server 120. In some embodiments, the notification 141 may also include a description of the live event that the user is being requested to capture. In some examples, a user of the first recording device 110 may have previously opted-in to receiving such recording requests. In such examples, prior to sending the notification 141 to the recording device 110, the server 120 may have received a message from the recording device 110 indicating that the user of the recording device 110 has opted-in to live streaming requests. The first recording device 110 may display the received notification 141, and a user of the first recording device 110 may provide input 142 responsive to the notification 141. For example, the user may "tap" a response on a touchscreen of the first recording device 110, which causes the first recording device 110 to send an input 142 responsive to the notification 141 to the server 120. Examples of device notifications are further described with reference to FIGS. 3-5.

In response to the receiving the input 142, the server 120 may send configuration information 143 to the first recording device 110. The configuration information 143 may include encoder configuration information and/or connection configuration information. Encoder configuration information may automatically configure a mobile encoder application of the first recording device 110 to capture and provide a video stream 118 to the server 120. For example, such encoder configuration information may include an encoding bitrate, a frame resolution, a frame rate, a key frame interval, an audio coder/decoder (CODEC), a video CODEC, or any combination thereof. Connection configuration information may enable the first recording device 110 to automatically communicate with the server 120. For example, such connection configuration information may include a network address (e.g., IP address) and/or port of the server 120, an application and/or stream name at the server 120, authentication information (e.g., username/password) to be used by the first recording device 110 to communicate with the server 120, or any combination thereof.

Although FIG. 1 illustrates the configuration information 143 being separate from the notification 141 and sent after the notification 141, in alternative examples, at least a portion of the configuration information 143 may be included in the notification 141. In such examples, a mobile encoder application may be automatically launched and configured in response to a user of the first recording device 110 indicating a willingness to record a video stream at the target location 111.

Alternatively, or in addition, the server 120 may determine, based on the location information 116, that the second recording device 112 is within a particular range of the target location 111. In response, the server 120 may send a notification 145 to the second recording device 112. The notification 145 to the second recording device 112 may include a request to travel to the target location 111 and to provide the server 120 a video stream recorded at the target location 111. In some examples, the notification 145 may include compensation information to incentivize the user of the second recording device 112 to travel to the target location 111. A user of the second recording device 112 may provide input responsive to the notification 145, such as accepting the request or declining the request. If the user accepts the request, the server 120 may provide the second recording device 112 directions 144 (e.g., driving directions, walking directions, biking directions, public transport directions, etc.) to the target location 111. Alternatively, such directions 144 may have been included as part of the notification 145. In some examples, the directions 144 are displayed by the second recording device 112 in a maps or navigation application. Examples of directions to the target location 111 are further described with reference to FIG. 4.

When the server 120 determines (e.g., based on updated location information 116) that the second recording device 112 has traveled to the target location 111, the server 120 may send configuration information to the second recording device 112. Alternatively, all or a portion of such configuration information may have previously been sent to the second recording device 112 as part of the notification 145 or the directions 144. In such examples, a mobile encoder application may be automatically launched and configured upon the second recording device 112 determining that it has reached the target location 111. Alternatively, encoding "profiles" (e.g., groups of parameters) may be pre-stored at the second recording device 112, and the configuration information may include a selection of a particular encoding "profile."

In the example of FIG. 1, the location information 116 may indicate that the third recording device 114 is located outside of the particular range of the target location 111. Accordingly, the server 120 may not send a notification to the third recording device 114.

The server 120 may receive video streams from recording devices. In the example of FIG. 1, the server 120 receives a video stream 118 from the first recording device 110. The server 120 may process the video stream 118 to provide the video stream 118 (or versions thereof) to the playback devices 180. The server 120 may also store the video stream 118 (or a portion thereof) in the data storage device(s) 134. In some examples, as further described herein, the server 120 may send an additional notification to the first recording device 110 to request that the user of the first recording device 110 adjust the manner in which the video stream 118 is being captured. Such additional notifications may be displayed within a mobile encoder "app" of the first recording device 110, as further described herein. Examples of additional device notifications are further described with reference to FIG. 5.

Thus, via the notifications illustrated and described with reference to FIG. 1, mobile device users may be informed of their proximity to an ongoing or upcoming live event. By enabling video streaming at a target location based on responses to such notifications, real-time video recordings of various live events may be acquired (e.g., by the server 120) in a quick and efficient manner. The described techniques may enable users' mobile devices to reliably serve as stream capture sources with enhanced mobility/flexibility. Moreover, use of the desired techniques to acquire and aggregate video content may be cheaper than maintaining camera/reporting teams around the world that can be dispatched in time to cover a live event, and may also enable acquiring video feeds from locations where it is impractical to dispatch a professional camera/reporting team.

In some examples, the system 100 of FIG. 1 may at least partially be driven based on crowdsourcing. To illustrate, a user of the first recording device 110 may begin capturing a video stream while at the target location 111, without prior prompting or notification from the server 120, because a live event that is of interest to the user is occurring at the target location 111. The first recording device 110 may upload the resulting video stream 118 to the server (or to another website, such as a social networking website that is accessible to the server). Based on a user-performed or automatic analysis of the video stream 118, metadata associated with the video stream 118, social network activity from devices that are proximate to the target location 111, etc., the server 120 may request additional recording devices that are near the target location (e.g., the second recording device 112) to capture and provide additional video streams. In some examples, the server 120 sends such requests for additional video streams from a location based on a number of video stream that are already being received from that location.

Figure 2:
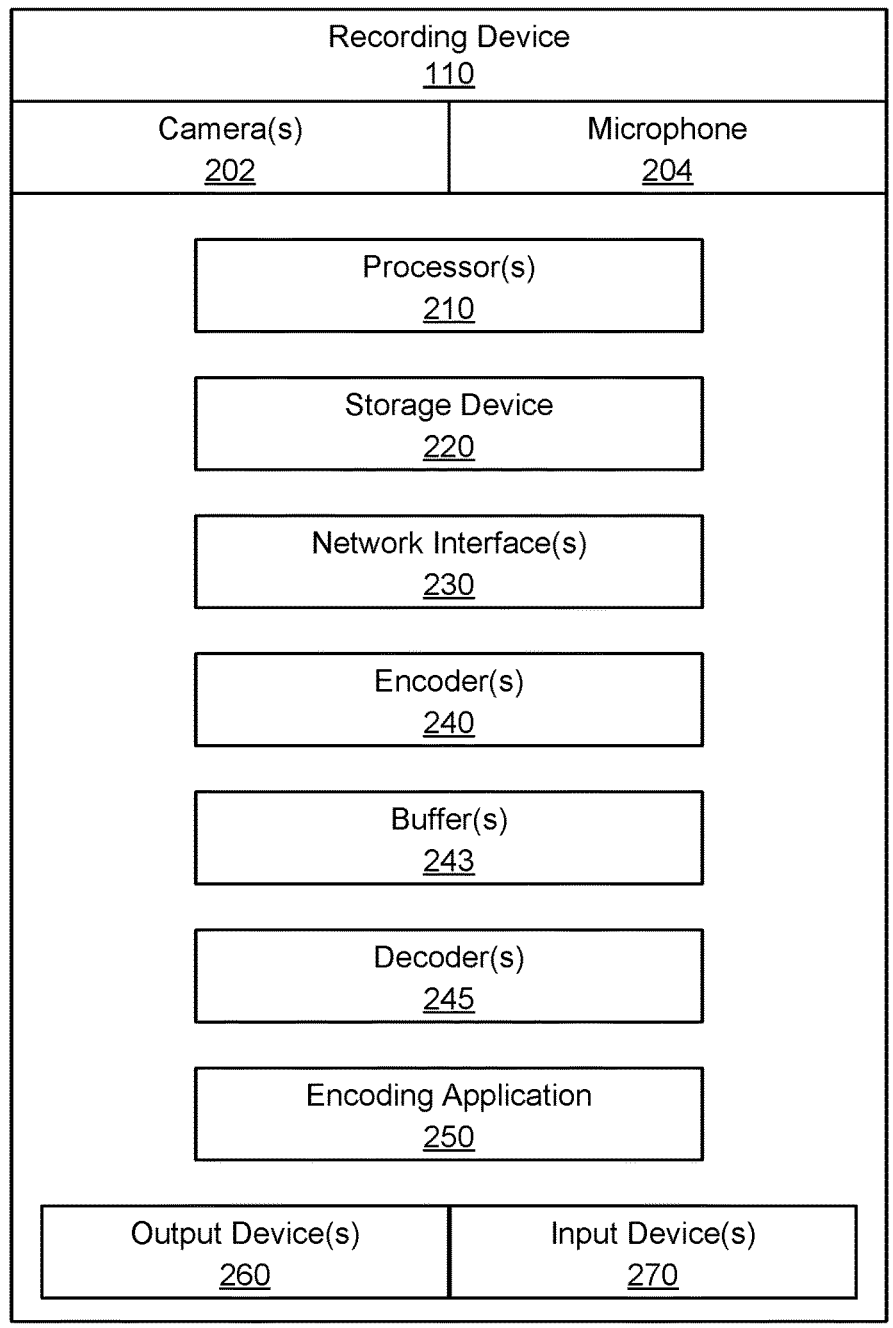
FIG. 2 depicts an exemplary block diagram of the recording device of FIG. 1.

Referring to FIG. 2, an exemplary block diagram of the first recording device 110 is shown. It is to be understood that the other recording devices 112, 114 of FIG. 1 may include similar components. The first recording device 110 includes one or more processors 210 and one or more network interfaces 230. The one or more network interfaces 230 may include input interface(s) and output interface(s) that are configured to receive data and to send data, respectively. In a particular embodiment, the one or more network interfaces 230 may be wired and/or wireless interfaces that enable the first recording device 110 to transfer and receive data via a network, such as a local area network (LAN) or a wide area network (WAN), such as the Internet. For example, the one or more network interfaces 230 may include an Ethernet interface, a wireless interface compatible with an Institute of Electrical and Electronics Engineers (IEEE) 802.11 protocol, and/or a wireless interface capable of transferring data over a third-generation (3G) connection or a fourth generation (4G) connection (e.g., a Long Term Evolution (LTE) connection and/or a LTE Advanced connection).

The first recording device 110 may also include one or more cameras 202 or other video capture devices and a microphone 204 or other audio capture devices to capture live video and/or audio events. The first recording device 110 may contain a storage device 220 for storing captured events as well as software programs and/or data used by the first recording device 110. In a particular embodiment, the storage device 220 may include one or more random access memory (RAM) devices, read-only memory (ROM) devices, hard-drives, solid state drives, and/or other devices that may be used to store data.

The first recording device 110 may further include one or more encoders 240, decoders 245, and an encoding application 250, each of which may be implemented using hardware and/or software (e.g., instructions executable by the one or more processors 210). The one or more encoders 240 may be used to encode data (e.g., that is to be transferred to the server 120 of FIG. 1), and the one or more decoders 245 may be used to decode encoded data that is received from the server 120 or from another source. In a particular example, the encoded data may represent a media stream (or a portion thereof) and may include audio and/or video data. In a particular embodiment, a video portion of the stream may be encoded by the one or more encoders 240 using an Advanced Video Coding (AVC) codec/decoder (codec), also known as H.264, and the audio portion of the stream may be encoded using an Advanced Audio Coding (AAC) codec. H.264 is an industry standard for video compression used for recording, compressing, and distributing high definition video. AAC is a standardized compression and encoding format for digital audio. In alternate embodiments, different video and audio codecs may be used.

In a particular embodiment, the encoder(s) 240 and decoder(s) 245 are configured to use one or more buffers 243 while performing encoding and decoding operations. For example, "raw" video data may be stored in a first buffer. The encoder(s) 240 may retrieve frame(s) of the "raw" video data, encode the frame(s), and store the encoded frame(s) in a second buffer for subsequent processing and transmission to the server 120. The encoder 240 may store and utilize configuration information including information related to a destination server, destination authentication information, and encoding configuration information (i.e., encoding parameters). It should be noted that the various parameters and options described herein are for example only and are not to be considered limiting. To illustrate, many different parameters and options may be provided to and/or presented by the first recording device 110. The parameters and options may include, but are not limited to, frame size, bitrate, video coder/decoder (CODEC), audio CODEC, audio sampling rate, number of audio channels, stream encryption, etc. As further examples, a user may be provided options to specify digital rights management (DRM) settings, times that a stream is to be made available to a user, geographic locations that viewers are to be located in to view the stream, etc.

The encoding application 250 may be a software application, such as an application provided by a vendor of the server 120. The encoding application 250 may thus represent a mobile encoder "app" that is pre-installed on the first recording device 110 or that is downloaded by a user, such as from a mobile device storefront or the Internet. The encoding application 250 may generate a graphical user interface (GUI) and may send the GUI to an output device 260 (e.g., a display device) of the first recording devices 110. A user of the first recording device 110 may interact with the GUI using an input device 270 (e.g., a keyboard, a mouse, a touchscreen, etc.).

Although not shown in FIG. 2, in some examples the first recording device 110 may further include a media player application. That is, the first recording device 110 may be capable of capturing media streams as well as playing back media streams. In a particular embodiment, the media player application corresponds to hardware circuits, software instructions stored in the storage device and executable by the processor 210 to perform media player functionality, or a combination thereof. In some examples, the media player application may be a standalone application that is downloaded or installed to the first recording device 110. In other examples, the media player application is included in or invoked by another application executed at the first recording device 110.

Figure 3:
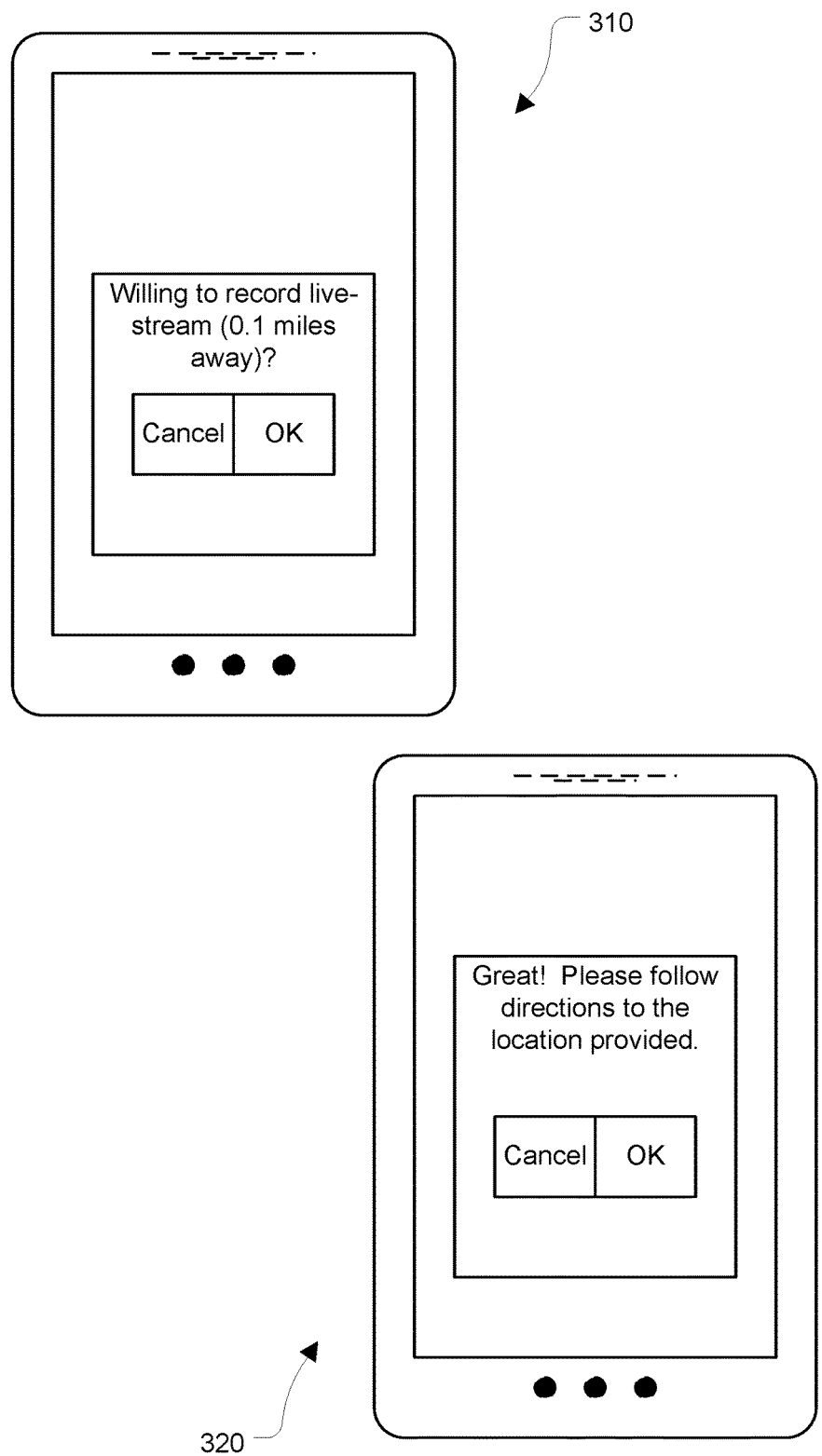
FIG. 3 depicts exemplary screenshots of notifications that may be sent from the server to the recording device of FIGS. 1 and 2.

FIG. 3 depicts exemplary screenshots 310 and 320 of notifications that, for example, may be sent by the server 120 and displayed by one or more of the recording devices 110-114. Alternatively, such notifications may be generated by the encoding application 250 of FIG. 2. For instance, the encoding application 250 may be a software application that is executable to capture and encode a media stream that is then transmitted to the server 120. In an example, when a user has opted-in to record live events, a notification may "pop up" on the screen of the user's mobile device (e.g., the second recording device 112). For example, when the user is near the target location 111 (as determined by the server 120 or by the second recording device 112), a first notification shown in the first screenshot 310 may "pop up" on the screen of the second recording device 112 to determine whether the user is willing to record a video stream from a location that is within a particular range of the user (e.g., 0.1 miles away in the illustrated example). The particular range may be user-set, server-defined, and/or based on contextual information (e.g., the range may be larger if the location information indicates that the user is travelling in a vehicle). In an illustrative example, the server may identify the target location, identify devices in range of the target location, and send notifications to those devices. In another example, the server may identify the target location and send information regarding the target location to devices in a general area of the target location (e.g., to all devices camped on a particular cellular network base station), and individual mobile devices may determine whether to display the notification based on respective distances to the target location.

In response to the notification, the user may select one of the selectable icons, e.g., "Cancel" or "OK." In some examples, if the user selects "OK," a second notification shown in the second screenshot 320 may "pop up" to inform the user that the directions 144 have been provided.

Figure 4:
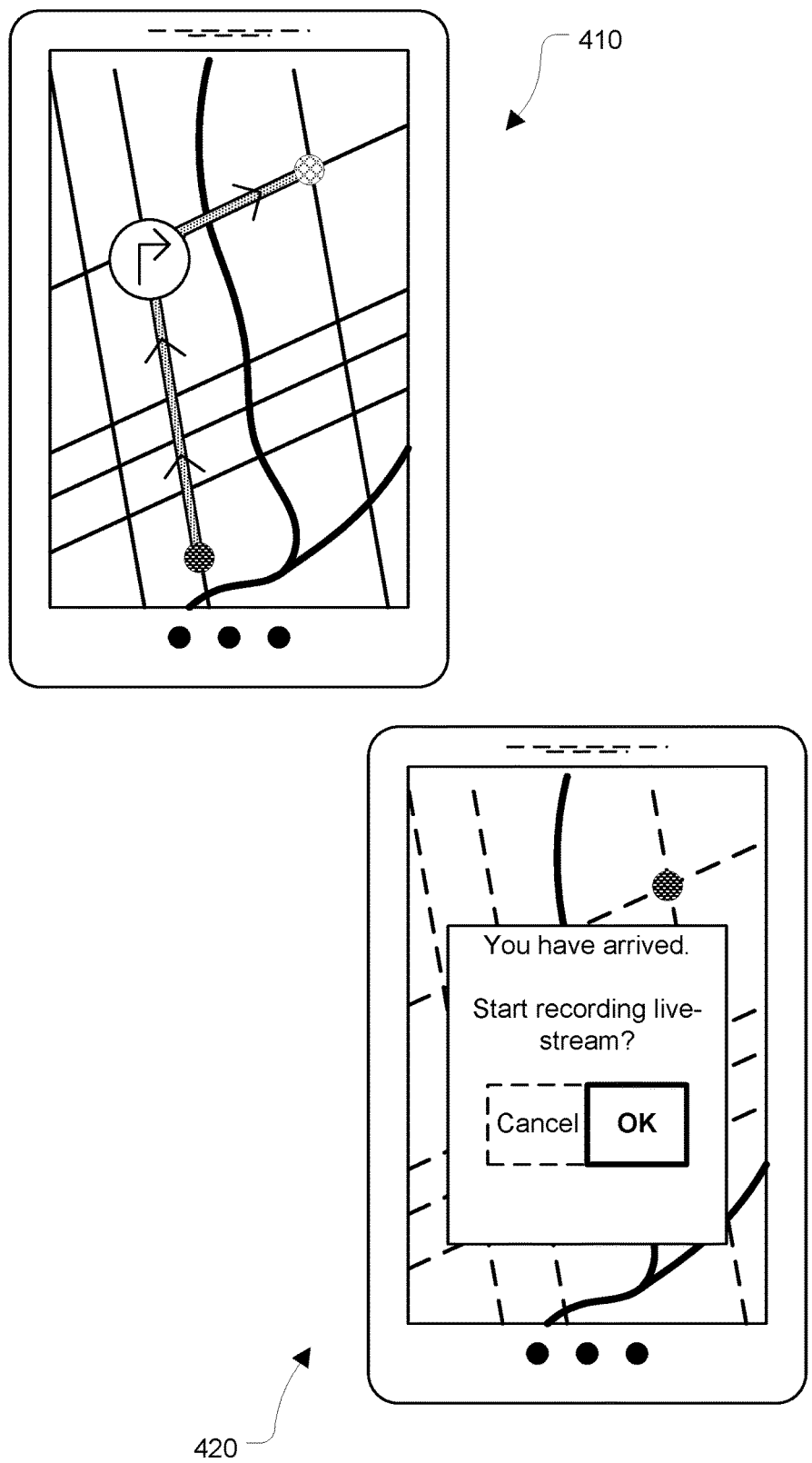
FIG. 4 depicts exemplary screenshots of directions to a target location and an example notification that may be sent to the recording device of FIGS. 1 and 2.

Continuing to FIG. 4 screenshots 410 and 420 are of the directions 144 are shown. For example, as shown in a third screenshot 410, a maps application may be executed at the second recording device 112 to direct the user from their current location to that the target location. In the illustrated embodiment, the maps application highlights a recommended route to the target location. In some examples, visual and/or audible navigation instructions (e.g., turn-by-turn voice assistance) are provided to the user. In an example, the second recording device 112 (and therefore the user) arrives at the target location 111, as shown in a fourth screenshot 420, another notification may "pop up" prompting the user to start recording a video stream. In a particular example, the second recording device 112 determines that it has arrived the target location 111 (e.g., based on GPS information determined at the second recording device 112) and automatically displays the notification shown in the fourth screenshot 420. Alternatively, the server 120 may determine that the second recording device 112 has reached the target location 111 and may send the shown notification to the second recording device 112 in response.

Figure 5:
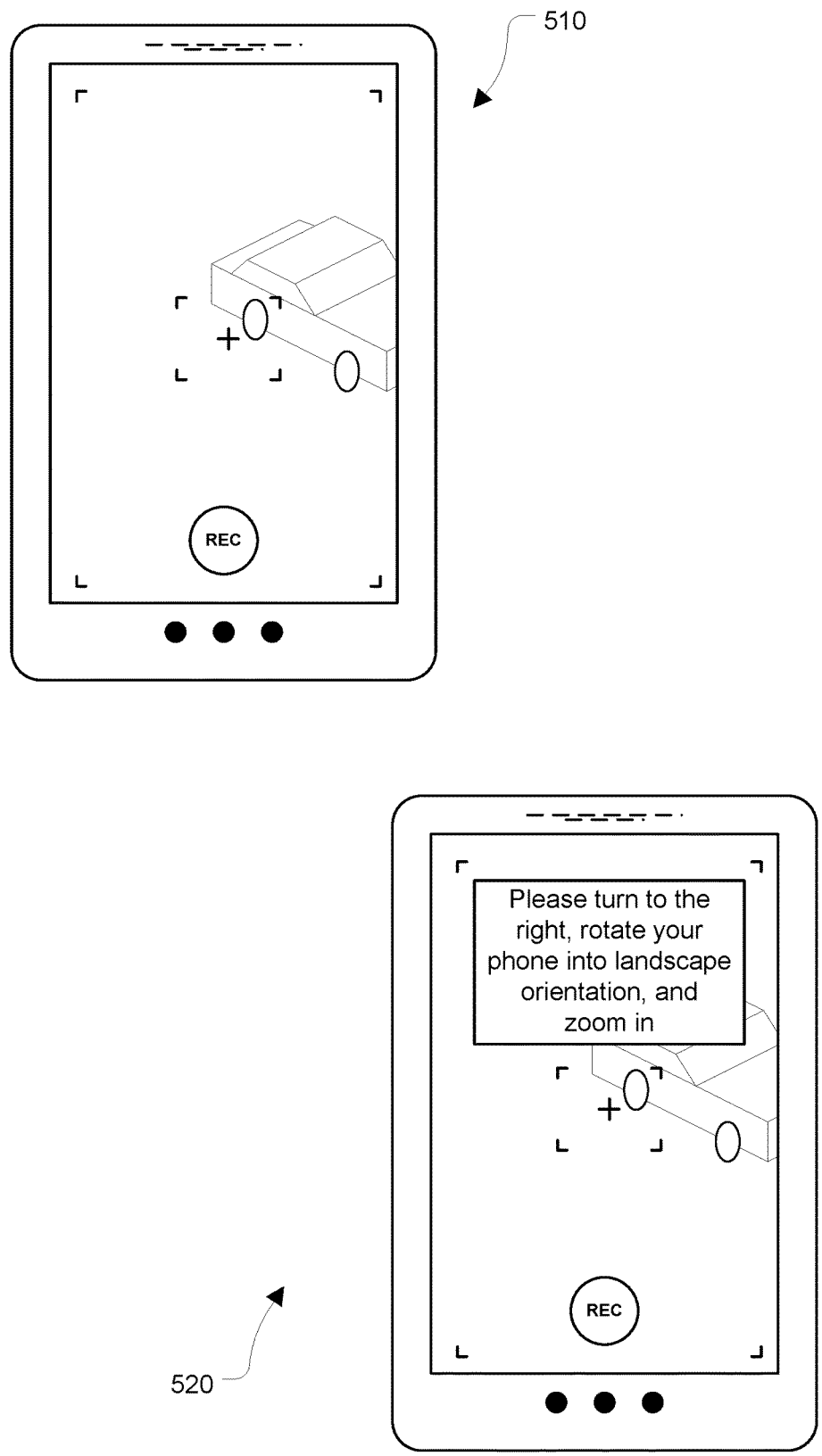
FIG. 5 depicts exemplary screenshots of the recording device of FIGS. 1 and 2 recording a video stream and of the recording device receiving a subsequent notification from the server of FIG. 1.

FIG. 5 depicts exemplary screenshots 510 and 520 of a camera "viewfinder" of the recording device 112 recording a video stream. To illustrate, the screenshots 510 and 520 may correspond to an interface generated during execution of a mobile encoder "app" (e.g., the encoding application 250) at the second recording device 112. A fifth screenshot 510 indicates that a live video stream is being recorded while the user of the second recording device 112 has positioned the second recording device 112 such that a portion of a vehicle is being captured. In some examples, the user may depress a "virtual" record button (e.g., a red touchscreen button that includes the characters "REC") to initiate recording. In other examples, the mobile encoder app may automatically initiate recording.

Thus, in some embodiments, the notification/request sent to a mobile device may, when accepted by a user of the mobile device, automatically trigger a sequence of actions that includes launching a maps/navigation "app" to provide the user directions to the a target location, determining based on GPS information that the user has reached the target location, launching a camera/mobile encoding application, configuring the launched application, and capturing/transmitting a live video stream from the target location. In some examples, the notification/request is a pop-up or other on-screen message at the mobile device. Alternatively, the notification/request can be embedded in a text message, an e-mail, etc. To illustrate, the notification/request can be a link included in a text message, a link or button included in an e-mail accessed by the mobile device, etc. In a particular aspect, the same request data is sent to each mobile device that is within a particular range of a target location. Alternatively the request data may be sent to each mobile device that has opted-in to receiving such requests, and individual mobile devices may determine, based on their own location and based on the target location indicated in the request data, whether to disregard the request data or to display the a notification that is generated based on the request data. If a user elects to provide a live stream, the mobile device of that user may determine whether or not the user is already at the target location. If so, the mobile device may launch a camera/mobile encoding "app." If not, the mobile device may first launch a maps/navigation "app."

In some examples, while receiving a video stream from a recording device, the server 120 of FIG. 1 may provide additional notifications or instructions to the recording device. To illustrate, as shown in a sixth screenshot 520, the server 120 may send an additional notification to the second recording device 112 while the second recording device 112 is capturing the video stream and transmitting the video stream to the server 120. The notification may indicate a request to perform additional actions, such as a request to modify at least one of an orientation of the mobile device, a line of sight of a camera of the mobile device, a zoom parameter of the camera, a brightness parameter of the camera, etc. Alternatively, the additional notification may automatically adjust a recording or encoding parameter at the recording device. To illustrate, the additional notification may automatically adjust a video encoding bitrate, frame rate, and/or frame size of the video stream being generated by the recording device to send to the server.

In some examples, an additional notification may instruct the user to travel to a different target location. In accordance with the described techniques, additional notifications may be generated and displayed before streaming begins and/or during streaming (e.g., the notifications may overlay all or part of a "viewfinder" screen in a streaming application executed by a recording device).

It is to be understood that the various screenshots illustrated in FIGS. 3-5 are provided as examples, and are not to be considered limiting. In alternative implementations, different visual notifications and application interfaces may be generated and displayed in accordance with the techniques of the present disclosure.

Figure 6:
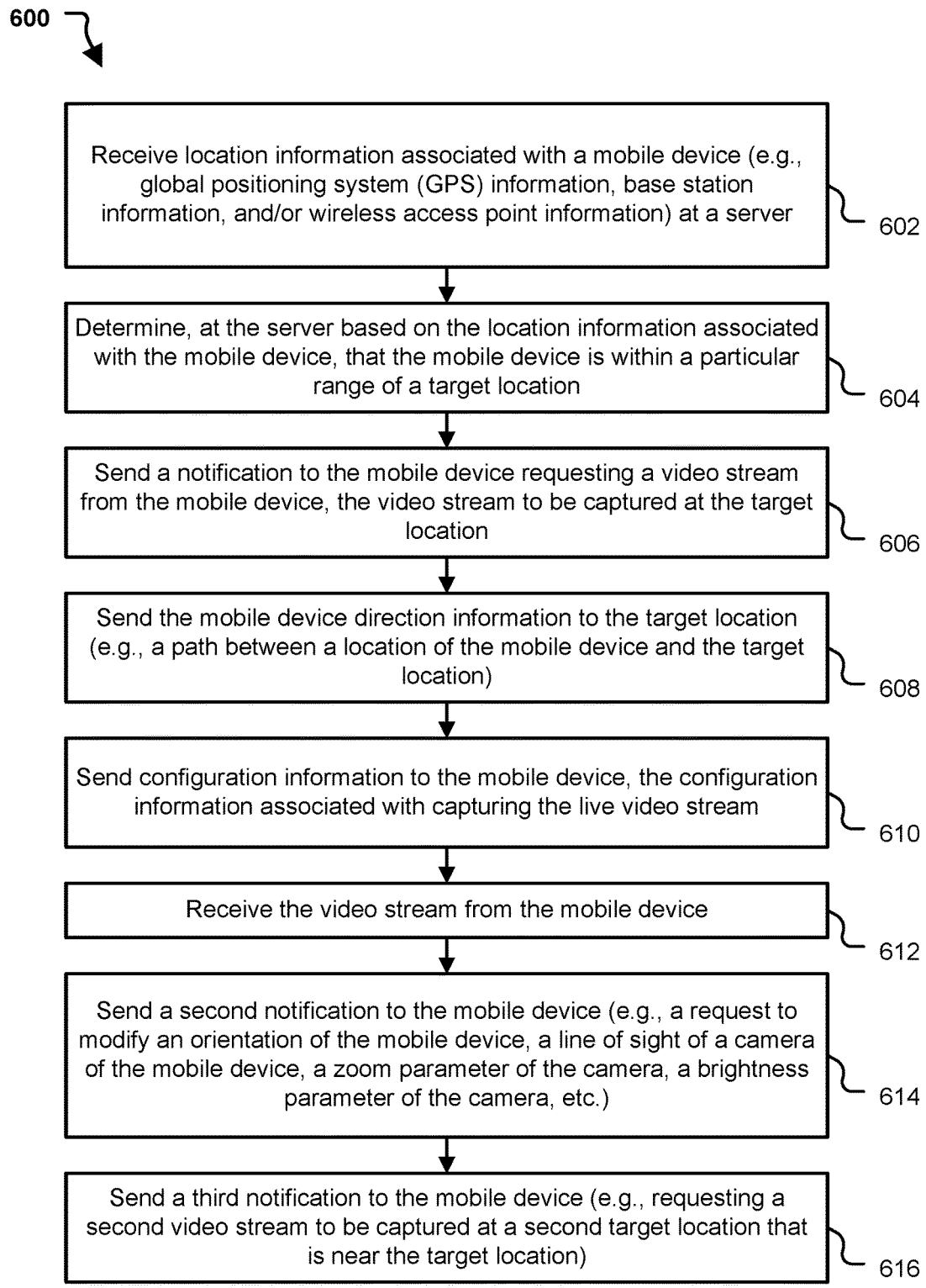
FIG. 6 is a flowchart that illustrates a method of supporting streaming at target locations.

FIG. 6 illustrates a particular embodiment of a method 600 to support streaming at target locations. In an illustrative embodiment, the method 600 may be performed by the server 120 of FIG. 1.

The method 600 includes receiving location information associated with a mobile device at a server, at 602. The location information may include GPS information, base station information (e.g., information regarding a cellular network base station in communication with the mobile device), and/or wireless access point information (e.g., information regarding a wireless access point that the mobile device has associated with for network service). For example, referring to FIG. 1, the server 120 may receive the location information 116 associated with one or more of the recording devices 110-114.

The method 600 also includes determining, at the server based on the location information associated with the mobile device, that the mobile device is within a particular range of a target location, at 604. For example, based on the location information 116, the server 120 may determine that the first recording device 110 is at the target location 111 and that the second recording device 112 is within the particular range of a target location 111.

The method 600 further includes sending a notification to the mobile device requesting a video stream from the mobile device, at 606, where the video stream is to be captured at the target location. For example, the server 120 may send the notifications 141, 145 to the recording devices 110 and 112, respectively. Each of the notifications 141, 145 may request a video stream to be captured at the target location 111. The method 600 includes sending the mobile device direction information to the target location (e.g., a path between a location of the mobile device and the target location), at 608. For example, the server 120 may send the second recording device 112 the directions 144, as shown in FIG. 1.

The method 600 includes sending configuration information to the mobile device, the configuration information associated with capturing a video stream, at 610. For example, the server 120 may send the configuration information 143, as shown in FIG. 1. In examples, configuration information may indicate an encoding bitrate, a frame resolution, a frame rate, a key frame interval, an audio coder/decoder (CODEC), a video CODEC, an IP address, a port number, an application, a stream name, a username, a password, or any combination thereof.

The method 600 further includes receiving the video stream from the mobile device, at 612. For example, the server 120 may receive the video stream 118 from the first recording device 110. The method 600 also includes sending a second notification to the mobile device, at 614. As illustrative non-limiting examples, the second notification may indicate a request to modify an orientation of the mobile device, a line of sight of a camera of the mobile device, a zoom parameter of the camera, a brightness parameter of the camera, etc. To illustrate, the second notification may include or correspond to the notification shown in the sixth screenshot 520 of FIG. 5.

The method 600 further includes sending a third notification to the mobile device, at 616. The third notification may request a second video stream to be captured at a second target location that is near the target location. For example, the server 120 of FIG. 1 may send the first recording device 110 an additional notification requesting the user of the first recording device 110 to travel to and capture/transmit a live video stream from another target location that is near the target location 111. Upon receiving video stream(s) from devices that are at target locations, server 120 may process the streams and make the streams available to playback devices, share the streams with other content aggregators, store the streams for subsequent use, etc.

The method 600 of FIG. 6 may thus enable a server, such as the server 120, to request, receive, and manage video streaming from mobile devices that are near target locations.

Figure 7:
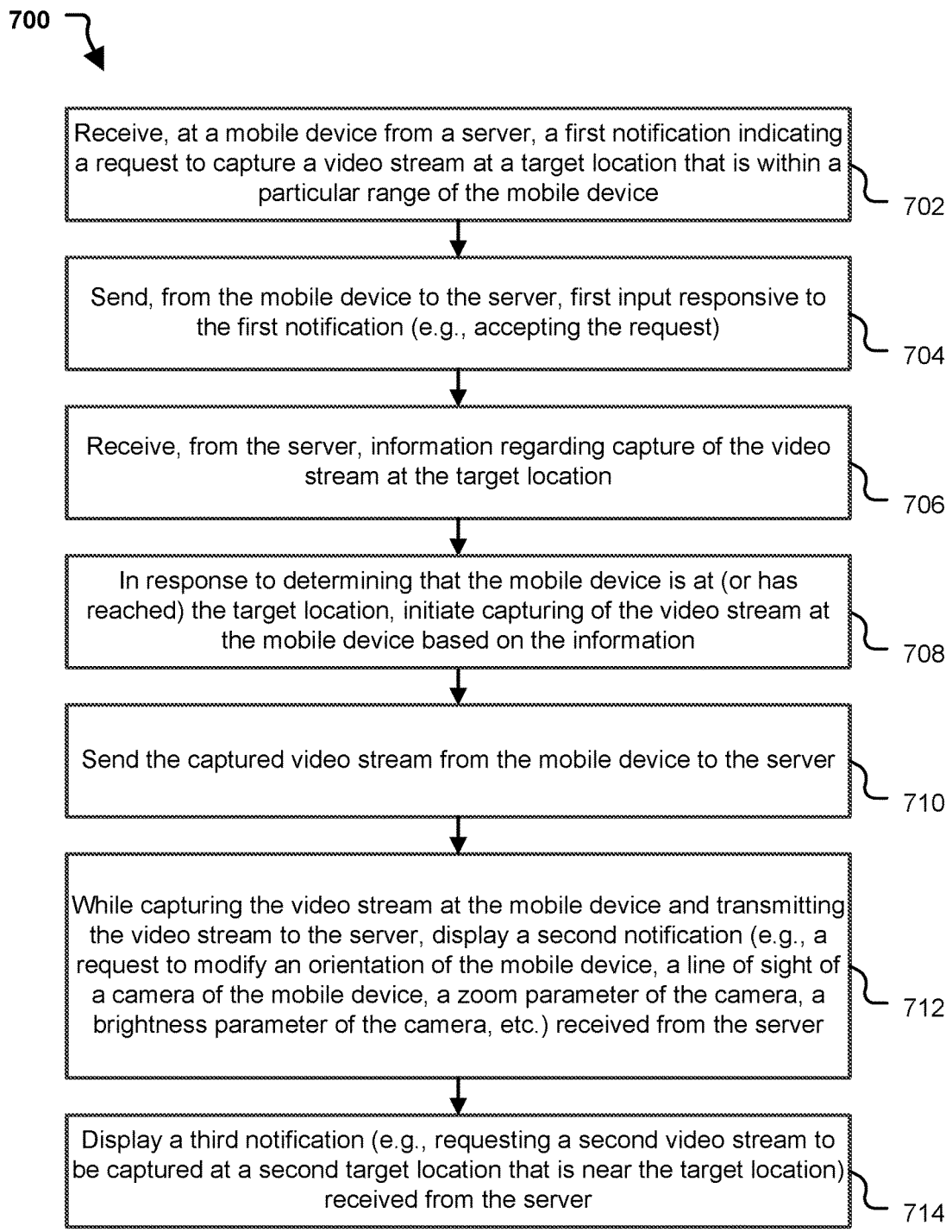
FIG. 7 is a flowchart that illustrates a method of supporting streaming at target locations.

FIG. 7 illustrates a particular embodiment of a method 700 to support streaming at target locations. In an illustrative embodiment, the method 700 may be performed by a mobile computing device, such as one or more of the recording devices 110-114 of FIG. 1.

The method 700 includes receiving, at a mobile device from a server, a first notification indicating a request to capture a video stream at a target location that is within a particular range of the mobile device, at 702. For example, the first recording device 110 may receive the notification 141 from the server 120. As another example, the second recording device 112 may receive the notification 145 from the server 120. The notification 145 may the same as or similar to the notification shown in the first screenshot 310 of FIG. 1.

The method 700 also includes sending, from the mobile device to the server, first input responsive to the first notification, at 704. The first input may accept the request. For example, the first recording device 110 send the input 142 to the server 120, as shown in FIG. 1.

The method 700 further includes receiving, from the server, information regarding capture of the video stream at the target location, at 706. For example, the first recording device 110 may receive the configuration information 143 from the server 120. Information regarding capture of a video stream at a target location can include information that is used during the capturing of the video stream and/or communication of the video stream (e.g., to a server). In non-limiting examples, information that enables a device to capture a video stream at a target location may include GPS information associated with the target location, directions to the target location, an indication that the device is within the particular range of the target location, a description of at least one of person, a place, an object, or an event to be depicted in the video stream that is to be captured at the target location, encoder configuration information (e.g., indicating an encoding bitrate, a frame resolution, a frame rate, a key frame interval, an audio coder/decoder (CODEC), a video CODEC, etc.), connection configuration information (e.g., indicating a server URL/port, an application, a stream name, a username/password, stream encryption settings, etc.), or any combination thereof.

The method 700 also includes, in response to determining that the mobile device is at (or has reached) the target location, initiating capturing of the video stream at the mobile device based on the information, at 708. For example, in response to determining that it is at or has reached the target location 111, the recording devices 110, 112 may initiate capture of the video stream at the mobile device based on the information.

The method 700 further includes sending the captured video stream from the mobile device to the server, at 710. For example, the first recording device 110 may send the captured video stream 118 to the server 120. The method 700 includes, while capturing the video stream at the mobile device and transmitting the video stream to the server, displaying a second notification received from the server, at 712. The second notification may indicate a request to modify an orientation of the mobile device, a line of sight of a camera of the mobile device, a zoom parameter of the camera, a brightness parameter of the camera, etc. For example, while capturing the video stream 118 and transmitting the video stream 118 to the server 120, the first recording device 110 may display a second notification, such as the notification shown in the sixth screenshot 520 of FIG. 5.

The method 700 also includes displaying a third notification received from the server, at 714. The third notification may request a second video stream to be captured at a second target location that is near the target location. For example, the first recording device 110 may display an additional notification requesting the user of the first recording device 110 to travel to and capture/transmit a live video stream from another target location that is near the target location 111.

It should be noted that the steps illustrated in the flowcharts of FIGS. 6-7 and described elsewhere herein, including the ordering of such steps, are to be considered illustrative, and not limiting. In alternate embodiments, the order of steps may be different. Further, one or more steps may be optional and/or replaced by other steps. In addition, one or more steps may be consolidated.

It should be noted that in various implementations, the devices, apparatuses, and systems described herein may support additional types of functionality. For example, a computing device, such as a server (e.g., the server 120), may include various components configured to perform stream processing functions. Such operations may include, but are not limited to, encoding, decoding, bitrate conversion, CODEC conversion, frame size conversion, etc. Depending on a format of a received stream, a playback format supported by a requesting device, and/or transcoding parameters in use, a transcoding operation may trigger a decoding operation and/or a re-encoding operation. In a particular embodiment, parameters used by a transcoder are stored in one or more transcoding templates at a computing device, such as an eXtensible Markup Language (XML) file or other file. A computing device in accordance with the present disclosure may thus be configured to process data in accordance with multiple coding technologies and protocols.

In some examples, a computing device may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The computing device may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

Moreover, a computing device may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The computing device may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

Data stored at such a computing device may include stream data (e.g., frames of a live video stream), files, closed caption data, images (e.g., to be overlaid on top of a video stream), and other data. In a particular embodiment, the computing device may store a video on demand (VOD) item. The VOD item may include audio data, video data, text data, closed captioning (CC) data, and/or subtitle data. For example, the VOD item may be a movie or a television show. Alternately, the VOD item may be stored remote from the computing device and may be accessible by the computing device via a network (e.g., the Internet).

In a particular embodiment, a computing device may support adaptive streaming. For example, the computing device may be configured to generate an adaptive streaming manifest. The manifest may include information, such as a master rendition list, describing adaptive bitrate renditions that are available for adaptive streaming. To initiate an adaptive streaming session, a destination device (e.g., one of the playback devices 180) may request the manifest. Upon receiving the manifest, the destination device may determine which of the available renditions should be requested from the computing device. For example, the destination device may make such a determination based on buffering/processing capability at the destination device and/or network conditions (e.g., bandwidth) being experienced by the destination device.

Upon determining which rendition should be requested, the destination device may transmit a request to the computing device. Alternatively, the destination device may request and receive a rendition chunk list from the computing device, where the chunk list enables the destination device to request individual media chunks of an individual rendition. Thus, a request from the destination device may specify a particular portion or media chunk (e.g., portion "X") of the requested rendition. The particular portion may be specified using start/end frame numbers, start/end times, a portion number/identifier, etc. Depending on the adaptive streaming protocol in use, a requested portion may correspond to a "media chunk" of a rendition and/or a group of pictures (GOP). A "media chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition. Conversely, if playback and/or network conditions improve, the destination device may switch to a higher bitrate rendition. The computing device may generate key frame aligned portions for the adaptive streaming renditions, so that switching to a lower bitrate or higher bitrate rendition appears "seamless" (e.g., does not result in noticeable visual glitches or dropped frames).

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the recording devices 110-114, the server 120, one or more of the playback devices 180 of FIG. 1, a media server/stream relay server, a content delivery network (CDN) server (e.g., edge server), or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes determining, at a server based on location information associated with a mobile device, that the mobile device is within a particular range of a target location. The method also includes sending a notification to the mobile device requesting a video stream from the mobile device, where the video stream to be captured is at the target location.

In another particular embodiment, a method includes receiving, at a mobile device from a server, a first notification indicating a request to capture a video stream at a target location that is within a particular range of the mobile device. The method also includes sending, from the mobile device to the server, first input responsive to the first notification.

In another particular embodiment, an apparatus includes a network interface configured to: receive location information associated with a mobile device; receive a video stream from the mobile device; and send a notification to the mobile device. The apparatus also includes a processor and a memory. The memory stores instructions that, when executed by the processor, cause the processor to perform operations including determining, based on the location information associated with the mobile device, that the mobile device is within a particular range of a target location. The notification requests the video stream from the mobile device, where the video stream is to be captured at the target location.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   determining, at a server based on location information associated with a mobile device, that the mobile device is at a first location that is within a particular range of a target location; and
   in response to the determination, sending, from the server to the mobile device, a notification and direction information, the notification indicating a request for a user associated with the mobile device to travel to the target location and capture a video stream at the target location and the direction information indicating a path from the first location to the target location.

2. The method of claim 1, wherein the mobile device is determined to be within the particular range of the target location based on global positioning system (GPS) information associated with the mobile device, base station information associated with the mobile device, wireless access point information associated with the mobile device, or any combination thereof.

3. The method of claim 1, further comprising sending configuration information to the mobile device, the configuration information associated with capturing the video stream.

4. The method of claim 3, wherein the configuration information indicates an encoding bitrate, a frame resolution, a frame rate, a key frame interval, an audio coder/decoder (CODEC), a video CODEC, a network address, a port, an application, a stream name, a username, a password, or any combination thereof.

5. The method of claim 3, wherein at least a portion of the configuration information is included in the notification.

6. The method of claim 3, further comprising sending a message to the mobile device after the notification, wherein at least a portion of the configuration information is included in the message.

7. The method of claim 1, wherein the notification comprises a push notification.

8. The method of claim 1, wherein the notification comprises a mobile application notification.

9. The method of claim 1, further comprising, prior to sending the notification to the mobile device, receiving a message from the mobile device indicating that a user of the mobile device has opted-in to live streaming requests.

10. The method of claim 1, further comprising, after receiving at least a portion of the video stream from the mobile device and while a second portion of the video stream is captured at the mobile device, sending the mobile device a second notification requesting a second video stream to be captured at a second target location that is near the target location.

11. A method comprising:
    sending, from a mobile device to a server, an indication that a user of the mobile device has opted-in to live streaming requests;
    receiving, at the mobile device from the server after sending the indication to the server, a first notification indicating a request to capture a video stream at a target location that is within a particular range of the mobile device;
    sending, from the mobile device to the server, first input responsive to the first notification, the first input comprising an acceptance of the request to capture the video stream at the target location; and
    after sending the first input to the server, receiving, at the mobile device from the server, direction information indicating a path to the target location.

12. The method of claim 11, further comprising receiving, from the server, second information regarding capture of the video stream at the target location.

13. The method of claim 11, wherein the direction information comprises global positioning system (GPS) information associated with the target location, directions to the target location, or both.

14. The method of claim 12, wherein the second information comprises an indication that the mobile device is within the particular range of the target location.

15. The method of claim 12, wherein the second information includes a description of at least one of person, a place, an object, or an event to be depicted in the video stream.

16. The method of claim 12, wherein the second information comprises configuration information, wherein configuration information indicates an encoding bitrate, a frame resolution, a frame rate, a key frame interval, an audio coder/decoder (CODEC), a video CODEC, a network address, a port, an application, a stream name, a username, a password, or any combination thereof.

17. The method of claim 11, further comprising receiving, from the server while capturing the video stream at the mobile device and transmitting the video stream to the server, a second notification indicating a second request to modify at least one of an orientation of the mobile device, a line of sight of a camera of the mobile device, a zoom parameter of the camera, a brightness parameter of the camera, or a combination thereof.

18. An apparatus comprising:
    a network interface configured to:
        receive location information associated with a mobile device;
        receive a video stream from the mobile device;
        send a notification and direction information to the mobile device, the direction information indicating a path to a target location; and
        send a second notification to the mobile device while receiving the video stream captured at the target location from the mobile device, the second notification requesting a second video stream to be captured at a second target location;
    a processor; and
    a memory storing instructions that, when executed by the processor, cause the processor to perform operations including determining, based on the location information associated with the mobile device, that the mobile device is within a particular range of the target location, wherein the notification is associated with a request for the video stream from the mobile device, the video stream to be captured at the target location.

* * * * *